United States Patent [19]
Neff

[11] 4,271,864
[45] Jun. 9, 1981

[54] PRESSURE REGULATING VALVE

[75] Inventor: James A. Neff, Bloomfield Township, Oakland County, Mich.

[73] Assignee: Mac Valves, Inc., Wixom, Mich.

[21] Appl. No.: 135,777

[22] Filed: Mar. 31, 1980

[51] Int. Cl.³ .......................................... G05D 16/10
[52] U.S. Cl. ..................................... 137/599; 91/443; 137/493.8; 137/505.18
[58] Field of Search ................ 137/493, 493.7, 493.8, 137/493.9, 505.18, 536, 599; 91/443, 447

[56] References Cited

U.S. PATENT DOCUMENTS

| Re. 29,292 | 7/1977 | Tennis | 91/447 X |
|---|---|---|---|
| 1,519,856 | 12/1924 | Lorraine | 137/536 X |
| 2,047,654 | 7/1936 | Te Pas | 137/536 X |
| 2,272,684 | 2/1942 | Vickers | 91/447 |
| 2,501,483 | 3/1950 | Taylor | 91/443 X |
| 2,755,817 | 7/1956 | Barr | 137/536 |
| 3,400,735 | 9/1968 | Favors | 137/505.18 X |
| 4,168,720 | 9/1969 | Raskin | 137/505.18 |
| 4,175,473 | 11/1979 | Iizumi | 91/443 |
| 4,177,840 | 12/1979 | Neff et al. | 137/505.18 X |

*Primary Examiner*—Robert G. Nilson
*Attorney, Agent, or Firm*—Robert G. Mentag

[57] ABSTRACT

A pressure regulating and exhaust valve having an upstream port and a downstream port interconnected by a flow path. An adjustable pressure regulating valve is mounted in said flow path for regulating the downstream pressure in said flow path. The exhaust valve is a check valve that is mounted in parallel with said pressure regulating valve in said flow path for exhausting the downstream pressure from said downstream port to said upstream port.

8 Claims, 6 Drawing Figures

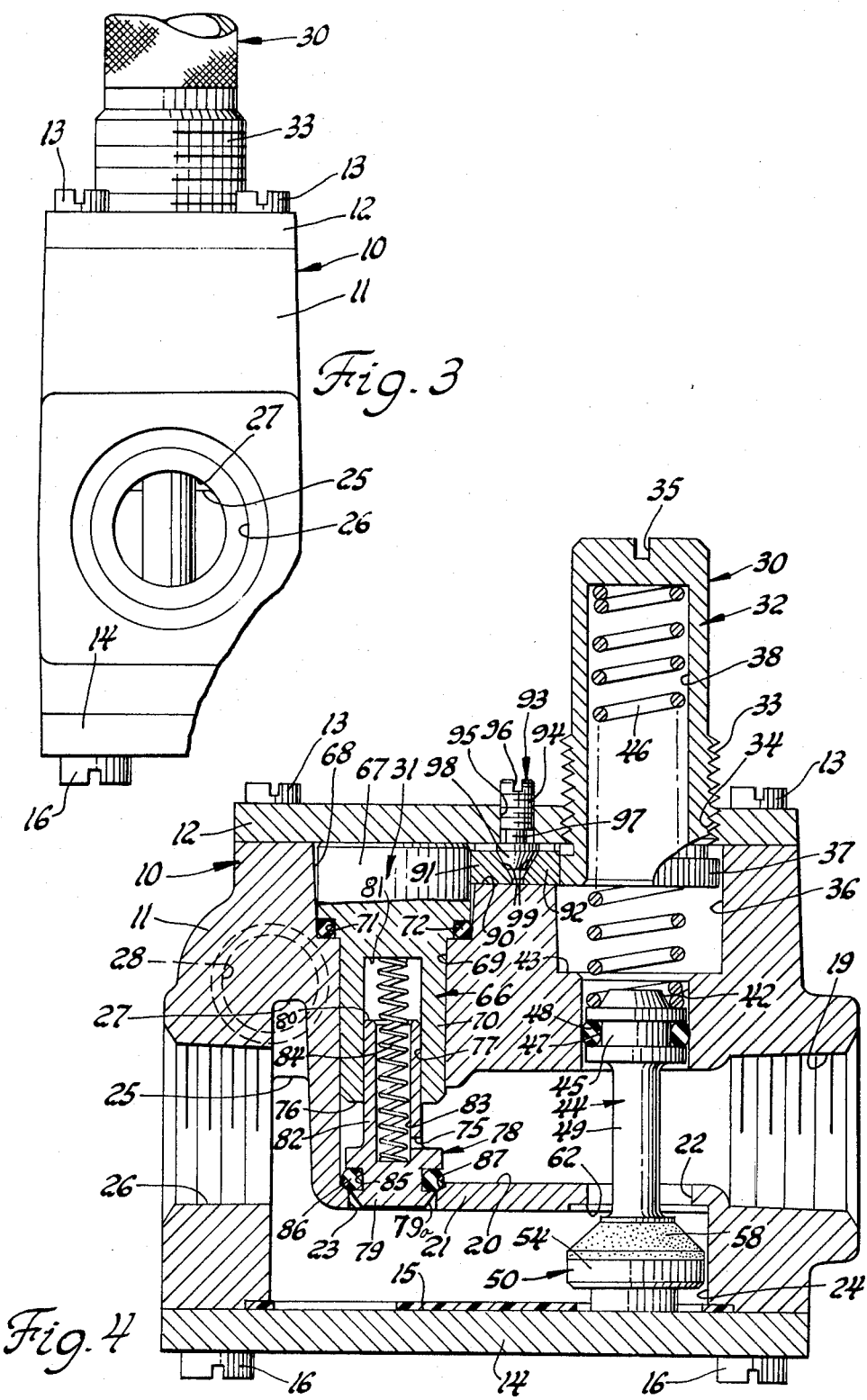

PRESSURE REGULATING VALVE

TECHNICAL FIELD

This invention relates generally to the valve art, and more particularly, to an improved air valve which comprises the functions of pressure regulating when air is flowing from an upstream port and through the valve in one direction to the downstream port, and free flow of air when air is flowing from the downstream port and through the valve in the other direction to the upstream port. The valve of the present invention is adapted for use in an air flow line to provide pressure regulation in the air flow line, as for example, an air supply line connected to one end of an air cylinder.

BACKGROUND ART

It is known in the air valve art to provide single or multiple pressure regulators to control the pressure of air supplied to an air cylinder or other device being controlled. Heretofore, multiple pressure regulators have been employed by mounting multiple directional valves in stacking fashion or on a common manifold base. However, such structure is expensive and awkward in use, and it is extremely difficult and expensive to provide pressure regulation to individual outlets. Because of the high cost, small space and relatively short life of diaphragms, and other components of pressure regulators, it is not common to use such multiple pressure regulators in a line between the outlet or cylinder port of a directional valve and a device being controlled as, for example, an air cylinder. Due to the complexity, space requirements and cost, it has not been practical heretofore to provide a pressure regulation means and free flow means between the cylinder port of a directional control valve and a device being controlled, such as an air valve. The result has been a waste of air requiring excessive pumping capacity, a waste of energy, and an increase in the cost of using air as a power and control means. Examples of the prior art regulating valves are illustrated in German Pat. No. 2,738,476 and in U.S. Pat. Nos. 2,272,091; 2,501,483; 2,698,632; Re. 29,292; 3,400,735; 3,621,867; 3,376,792; 3,747,629; 3,825,029, and 4,182,360. A further disadvantage of the prior art pressure regulating valves is that they do not provide a quick exhaust function for quickly and completely exhausting downstream pressure.

DISCLOSURE OF THE INVENTION

In accordance with the present invention, a combination pressure regulating and free flow valve is provided which can be installed in any line supplying air to an air operated apparatus, to regulate the pressure in one direction and provide a free flow of exhausting air in the other direction. The valve includes an adjustable pressure regulator valve which regulates the pressure of air supplied to an air supply line which is supplying air to an air operated apparatus. The valve includes a check valve which is operative when the air is flowing in said one direction, and which opens to exhaust air through said air supply line in the other direction when the supply air is removed from the valve.

The pressure regulator valve includes a valve element which is mounted on a lower valve stem member for controlling the flow of fluid through a first passageway which connects an upstream port with a downstream port. The lower valve stem member is adjustable by a regulator spring and a movable upper valve stem member. A check valve is operatively mounted in parallel with the regulator valve in a second passageway and functions first as a check valve when the regulator valve is operative to regulate pressure, and then functions secondly to exhaust the downstream pressure through the second passageway in a free flow out condition. The regulator valve element is moved to the open position when the downstream pressure drops and adds to the exhaust capacity when the valve is exhausting downstream pressure.

The valve structure for the valve of the present invention is simpler than the prior art regulating valve structures. The simpler valve structure results in lower tooling and manufacturing costs. The valve of the present invention is advantageous in that it provides, in one compact and economical unit, a pressure regulating valve and a free flow out valve.

BRIEF DESCRIPTION OF THE DRAWINGS

FIG. 3 is a right side elevation view of the structure illustrated in FIG. 2, taken along the line 3—3 thereof, and looking in the direction of the arrows.

FIG. 4 is an elevation section view, similar to FIG. 2, and showing the position of the valve structure when it is at rest and when pressurized air is flowing from the inlet port through the valve to the cylinder port.

BEST MODE OF CARRYING OUT THE INVENTION

Figure 1:
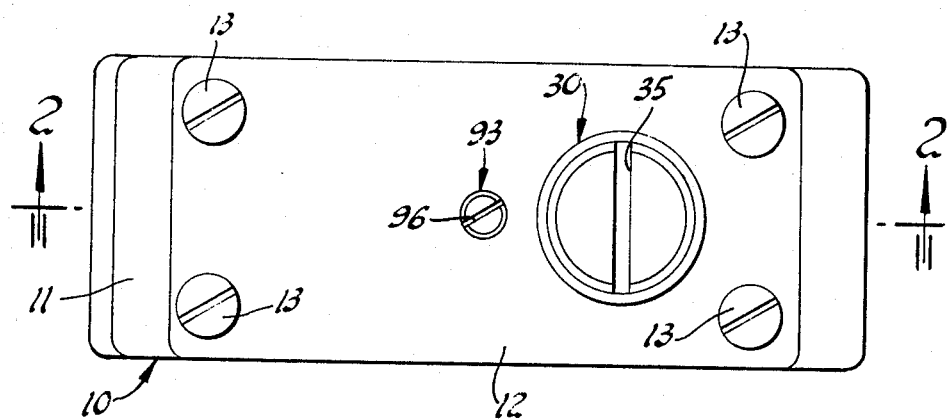
FIG. 1 is a top plan view of a pressure regulating valve made in accordance with the principles of the present invention.
Figure 2:
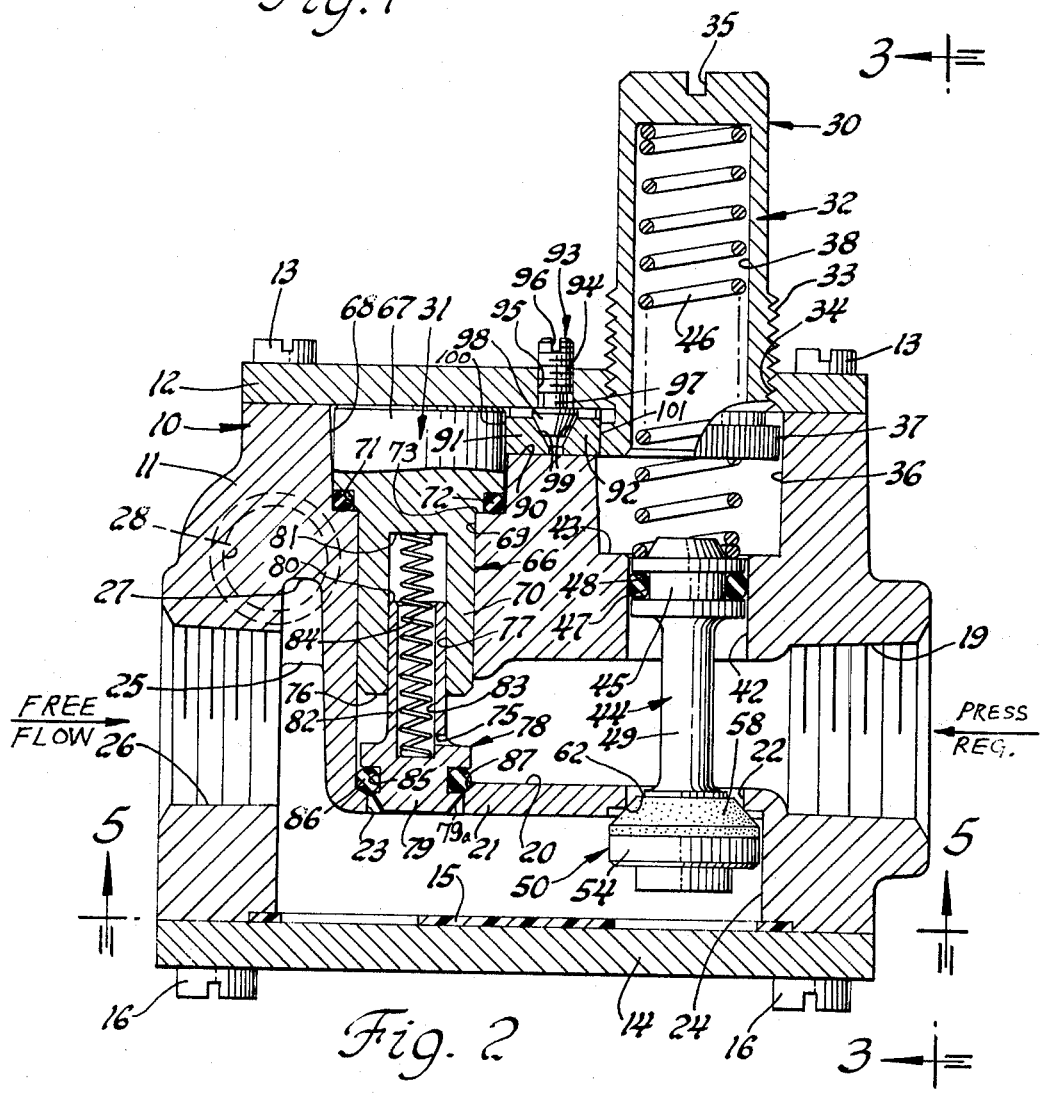
FIG. 2 is an elevation section view of the valve structure illustrated in FIG. 1, taken along the line 2—2 thereof, looking in the direction of the arrows, and showing the valve in a working position with the regulator valve moved to the closed position by downstream pressure.
Figure 5:
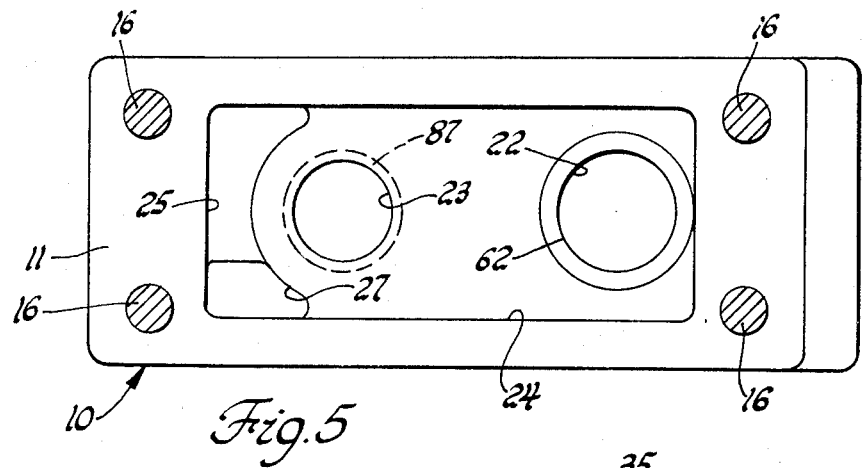
FIG. 5 is a bottom plan view of the valve body structure illustrated in FIG. 2, with the bottom end cover removed, taken along the line 5—5 thereof, and looking in the direction of the arrows.

Referring now to the drawings, and in particular to FIGS. 1, 2 and 3, the numeral 10 generally designates an illustrative embodiment of a pressure regulating valve made in accordance with the principles of the present invention. The valve 10 includes a valve body 11 which is enclosed on the top side by a top end cover plate 12 which is releasably secured in position on the valve body 11 by a plurality of suitable machine screws 13. A suitable bottom end cover plate 14 encloses the bottom end of the valve body 11, and it is releasably secured thereto by a plurality of suitable machine screws 16. A suitable gasket 15 is disposed between the bottom end cover plate 14 and the valve body 11.

The valve body 11 is provided with a threaded supply or upstream port 19 which is adapted to be connected by suitable conduit means to a suitable source of supply of pressurized air. The supply port 19 communicates with an upper or first interior passageway 20 which is centrally formed through the valve body 11. The upper interior passageway 20 communicates through a pair of longitudinally spaced apart bores or passageways 22 and 23 with a lower second interior passageway 24. The bores 22 and 23 are formed through a dividing wall 21 which is disposed between the passageways 20 and 24. As viewed in FIG. 2, the left end of the passageway 24 has a portion 25 which communicates with a threaded downstream or cylinder port 26, and a portion 27 which communicates with a threaded port 28 for the reception of a suitable gage, if desired, or a plug. The downstream port 26 is adapted to be connected to an apparatus to be controlled as, for example, the head end of an air cylinder.

As shown in FIG. 2, a pressure regulating valve, generally indicated by the numeral 30, is operatively mounted in the valve body 11 for controlling the flow of pressurized air entering the valve 10 through the supply port 19 and passing through the upper interior passageway 20 and out through the bore 22 into the lower interior passageway 24, and thence out of the valve through the downstream port 26. The numeral 31 in FIG. 2 generally designates a check valve for completely exhausting the downstream pressure, when the downstream pressure builds up to a certain pressure and the regulator valve 30 closes. The exhausting air enters the valve 10 through the downstream port 26 and flows through the lower interior passageway 24 and upwardly through the open bore 23 into the upper interior passageway 20 and out through the supply port 19 in a free flow manner.

As shown in FIG. 2, the adjustable pressure regulator valve 30 includes an upper cylindrical valve stem, generally indicated by the numeral 32, which is provided with peripheral thread 33 on the lower end thereof. The threaded lower or inner end of the valve stem 32 is threadably mounted through a threaded bore 34 which is formed through the top end cover 12, and it is extended downwardly into an enlarged bore 36 which is formed vertically in the valve body 11. A peripheral, annular stop flange 37 is integrally formed on the lower or inner end of the valve stem 32, below the thread 33, and it is adapted to function as a stop member when the upper valve stem 32 is threaded outwardly or upwardly, so as to bring the stop flange 37 into an abutting engagement with the inner face of the cover plate 12 through which is formed the threaded bore 34. The outer periphery of the annular stop flange 37 is knurled.

As shown in FIG. 2, the upper valve stem 32 is provided with an axial bore 38 which extends upwardly from the lower inner end thereof, and in which is operatively seated the upper end of a pressure regulating coil spring 46. The lower end of the regulating coil spring 46 extends downwardly through the bore 38 and into a reduced diameter communicating bore 42 in the valve body 11. A transverse shoulder 43 is formed at the junction point between the inner end of the bore 36 and the adjacent upper end of the bore 42. The lower end of the bore 42 communicates with the upper interior passageway 20.

As shown in FIG. 2, the lower end of the regulating coil spring 46 abuts the upper, head end of a lower valve stem, generally indicated by the numeral 44. The lower valve stem 44 includes the head or piston 45 which is slidably mounted in the bore 42. The lower valve stem head end 45 is provided with a peripheral groove 47 in which is operatively mounted suitable seal means 48. The lower valve stem 44 further includes an elongated, cylindrical guide rod portion 49 which is integrally attached at its upper end to the lower side of the valve stem head end 45. The guide rod portion 49 extends downwardly across the upper interior passageway 20, and through the bore 22, and thence into the lower interior passageway 24. A regulating valve element, generally indicated by the numeral 50, is fixedly mounted on the lower end of the guide rod portion 49, in the lower interior passageway 24, and it is movable between a raised or closed position, as shown in FIG. 4.

The regulating valve element 50 includes an annular valve body 54 (FIG. 2) which has an annular valve element 58 molded thereon that has a conically shaped upper peripheral face.

The valve element 58 may be made from any suitable elastomeric material which is molded onto the upper end of the annular valve body 54.

The lower end of the bore 22 terminates at a sharp junction point with the upper wall surface of the lower interior passageway 24 to form a circular, sharp edged valve seat 62 against which the tapered or conically disposed valve element 58 is adapted to be operatively seated when the regulator valve element 50 is in the closed position shown in FIG. 2. The upper valve stem 32 is provided with a transverse slot 35 on the upper outer end for the reception of a suitable tool for adjusting the upper valve stem 32.

As shown in FIG. 2, the check valve 31 includes a T-shaped upper valve stem which is indicated by the numeral 66, and which comprises a cylindrical head portion 67 that is seated in a bore 68 which extends inwardly into the valve body 11 for the upper end thereof. The upper valve stem 66 further includes an integral, reduced diameter, elongated cylindrical body portion 70 which is slidably mounted in a bore 69 that is of a diameter smaller than the bore 68. The bore 69 communicates at its upper end with the bore 68 and at its lower end with the upper interior passageway 20. The lower end of the upper valve stem head portion 67 is of a larger diameter than the bore 69, and a shoulder 73 is formed by the junction of the bores 68 and 69. An annular groove 71 is formed around the periphery of the lower end of the valve stem head portion 67, and a suitable O-ring seal 72 is operatively seated in said groove 71 and it sealingly engages the bore 68 and the shoulder 73.

As shown in FIG. 2, a poppet valve element, generally indicated by the numeral 78, is operatively associated with the aforedescribed valve stem 66, as described in detail hereinafter. The poppet valve element 78 functions as a check valve, as explained more fully hereinafter. The poppet valve element 78 includes a conical nose portion 79 which has a downwardly converging peripheral side face 79a. The poppet valve element conical nose portion 79 is provided with a peripheral groove 85 around which is operatively mounted a suitable seal 86. In the closed position, the seal 86 is adapted to be seated on an inwardly tapered circular valve seat 87, which is formed at the upper end of the bore 23, and which has a sharp inner circular edge.

As shown in FIG. 2, the poppet valve element 78 includes an elongated cylindrical movable valve stem 82 which has its lower end integrally attached to the conical nose portion 79. The valve stem 82 is slidably mounted in a cylindrical bore 77 which is formed in the lower end of the cylindrical body portion 70 of the upper valve stem 66. The numeral 81 indicates the upper end wall of the bore 77 in the valve stem 66. A longitudinal bore 83 is formed in the upper end of the valve stem 82 and it extends downwardly from the upper end 80 of the stem 82. A suitable light, coil spring 84 has the lower end thereof mounted in the stem bore 83 and the upper end is extended into the bore 77 and seated against the upper end wall 81 of the bore 77. The numeral 75 in FIG. 2 designates a vent hole for venting the stem bore 83 through the lower valve stem 82. The numeral 76 designates the lower end of the upper valve stem body 70. As shown in FIGS. 1 and 2, a locking screw means, generally indicated by the numeral 93 is operatively mounted in the upper end of the valve 10 for locking the upper valve stem 32 of the regulator valve 30 in an adjusted position. The locking means 93 comprises a screw 94 which is threadably mounted in the threaded bore 95 that is formed through the upper cover plate 12. The screw 94 has a cross slot 96 formed on the upper, outer end thereof for the reception of a suitable tool for rotating the screw 94. The screw 94 has a reduced diameter shaft 97 integrally attached to the inner end thereof. An inverted, conically shaped head 98 is integrally attached to the inner end of the shaft 97.

The locking means 93 also includes a pair of slidable locking plates 91 and 92 which are seated in a rectangular recess 90 that is formed in the upper end of the valve body 11, and which communicates with the bores 36 and 68. The locking plates 91 and 92 are spaced apart from each other and they each have a downwardly and outwardly sloping surface 99 formed on the upper end corner thereof for seating engagement with the conical head 98 on the screw 94. The outer surfaces 100 and 101 of the locking plates 91 and 92, respectively, are circularly formed in plan view for seating engagement against the outer curved periphery of the check valve outer stem head portion 67, and the circular flange 37 on the upper stem 32 of the regulator valve 30. It will be understood that when the screw 94 is turned inwardly, that the downward and inward movement of the conical head 98 will cam the locking plates 91 and 92 laterally outward into a fixed locking engagement with the check valve upper stem head portion 67 and the flange 37 on the regulator valve upper valve stem 32 to hold the regulator valve upper valve stem 32 in an adjusted position.

The valve of the present invention may be used in various air flow control applications for controlling the flow of air to and from an apparatus to be controlled and where a reduced downstream pressure is desired. An example is in the control of the flow of pressurized fluid to either end of an air cylinder, as to the head or piston end of an air cylinder for moving an air cylinder piston through a working stroke, and then exhausting the air in a free flow manner from the piston end of the cylinder to allow the piston to be returned to the starting position.

In the aforedescribed use, FIG. 4 shows the valve 10 at rest, with no pressure at the supply port 19 or the downstream port 26. FIG. 4 also shows the valve 10 is a working condition when pressurized air is flowing into the inlet port 19 and through the valve 10 and out the downstream port 26. FIG. 2 shows the valve 10 in a condition wherein a predetermined downstream pressure is reached and the regulator valve 30 closes. The valve stem 32 of the pressure regulator valve 30 is threaded inwardly to provide the desired spring pressure on the lower valve stem 44, equivalent to a predetermined downstream pressure.

When air under pressure is admitted from a suitable source into the supply port 19, the regulator valve element 50 is in the open or at rest position shown in FIG. 4 to allow air under pressure to pass from the upper interior passageway 20 down through the bore 22 into the lower interior passageway 24 and then out through the downstream port 26 to the head end of the cylinder to provide working air under pressure to the cylinder piston. The pressurized air in the upper interior passageway 20 functions to keep the check valve 78 in contact with valve seat 87 so that pressurized air can only flow from the upper interior passageway 20 to the lower passageway 24 through the bore 22. As the flow of pressurized air continues, pressure is built up downstream until it reaches an amount that is equivalent to the load applied by the regulating spring 46. The regulating valve 50 will then be moved upwardly to the closed position shown in FIG. 2, whereby the downstream pressure is reduced to a predetermined level.

Figure 6:
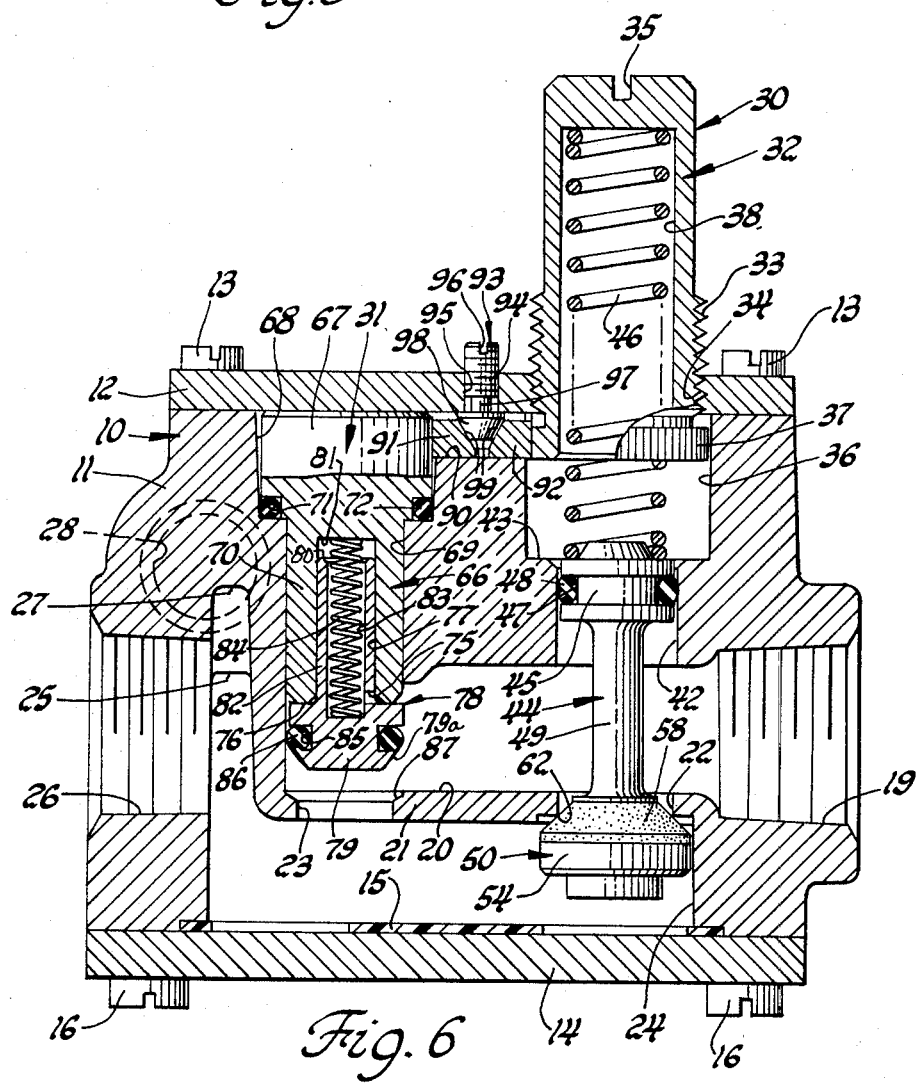
FIG. 6 is an elevation section view, similar to FIG. 2, and showing the valve in an exhaust position before the regulator valve opens due to lowered downstream pressure.

When line pressure is removed from the upstream port 19, to allow exhausting or dumping of the downstream pressure, the downstream pressure in the lower interior passageway 24 moves the poppet check valve 78 upwardly in a quick action against the light spring 84. The downstream pressure moves the valve 78 upwardly to the raised position shown in FIG. 6 to allow the downstream pressurized air to flow freely out into the upper interior passageway 20 and out through the inlet port 19. When the downstream pressure drops to a level less than the pressure exerted by the regulating spring 46, the regulator poppet valve 50 is moved downwardly to the at rest position shown in FIG. 4. When the downstream pressure is exhausted, the spring 84 moves the check valve 78 downwardly to the closed position shown in FIG. 1.

It will be seen that the valve of the present invention provides a regulating function when air is flowing through the valve 10 in one direction, and a free flow exhaust function when air is exhausting through the valve 10 in the other direction, and that such functions are carried out on air flowing through a single flow path. The single flow path is formed by the upper interior passageway 20 and the lower interior passageway 24. The combination pressure regulating and exhaust valve of the present invention is simpler in construction, and smaller in overall configuration than the prior art valves providing such actions. Accordingly, the valve of the present invention is economical, compact, and can be manufactured with less complicated manufacturing procedures than heretofore possible.

INDUSTRIAL APPLICABILITY

The combination pressure regulating and exhaust valve of the present invention is adapted for use in industrial air use applications where a reduced downstream pressure is desired. For example only, valves of the present invention may be used for connection to the ends of an air cylinder for controlling the operation of an air cylinder in either one direction, or both directions. The air cylinder would be employed in various types of industrial machines.

What is claimed is:

1. A combination pressure regulating and exhaust air valve, which does not include any flow rate control valve structure, for regulating the pressure of pressurized air in a flow circuit which includes a pneumatically controlled apparatus, characterized in that the valve includes:

(a) a valve body means having an upstream pressurized air supply port for connection to a source of pressurized air, and a downstream working port for connection to a pneumatically controlled apparatus in said flow circuit, and a single flow path interconnecting said ports;

(b) an adjustable pressure regulator valve means operatively mounted in said flow path and having a regulator valve element movable between open and closed positions to provide a regulated downstream pressure, without any flow control action, at the downstream working port when pressurized air is flowing from the source of pressurized air into the upstream port and through the flow path in one direction to the downstream port, and said regulator valve element moves to a closed position when the downstream pressure reaches a predetermined reduced level; and, (c) a non-adjustable exhaust check valve means operatively mounted in said flow path, in parallel with said adjustable pressure regulator valve means, and disposed in a closed position when pressurized air is flowing through the flow path in said one direction to the downstream port, and movable to an open position to provide a free flow of air exhausting through said flow path in the other direction to the upstream port without any flow control action.

2. A combination pressure regulating and exhaust air valve as defined in claim 1, characterized in that:

(a) said flow path interconnecting said ports includes a first passage portion connected to said upstream supply port, and a second passage portion connected to said downstream working port, and said first and second passage portions being connected by a first bore having a pressure regulator valve seat formed on the end thereof adjacent the second passage portion, and a second bore parallel to said first bore and having a check valve seat at the end thereof adjacent the first passage portion, and said adjustable pressure regulator means having a movable valve element for operable engagement with said pressure regulator valve seat, and said check valve means having a movable valve element for operable engagement with said check valve seat.

3. A combination pressure regulating and exhaust air valve as defined in claim 2, characterized in that:

(a) said adjustable pressure regulator valve means includes a movable lower valve stem member, with said movable regulator valve element being mounted on said lower valve stem member, and an adjustable bias means for exerting a bias on the lower valve stem member for regulating the downstream air pressure to a predetermined reduced level.

4. A combination pressure regulating and exhaust air valve, as defined in claim 3, characterized in that:

(a) said adjustable bias means, for exerting a bias on the lower valve stem member includes, an upper valve stem member threadably mounted in the valve body means, and a spring member having one end in engagement with the upper valve stem member and the other end in engagement with the lower valve stem member, whereby when said upper valve stem member is adjusted inwardly of the valve, the desired bias increases on the lower valve stem member and when the upper valve stem member is adjusted outwardly of the valve, the bias on the lower valve stem member decreases.

5. A combination pressure regulator and exhaust air valve, as defined in claim 4, characterized in that:

(a) said movable lower valve stem member has a head on one end thereof, which is engaged by said spring member, and which is movably mounted in a third bore in the valve communicating with said first passage portion and spaced from and in alignment with said first bore having a pressure regulator valve seat formed on the end thereof adjacent the second passage portion, and a pressure balancing seal means mounted around said lower valve stem head and sealing an area in said third bore equal to the area of the pressure regulator valve seat engaged by the pressure regulator movable valve element.

6. A combination pressure regulator and exhaust air valve as defined in claim 4, characterized in that:

(a) said check valve means includes a stationary valve stem member mounted in the valve and operatively carrying said check valve movable valve element.

7. A combination pressure regulator and exhaust air valve as defined in claim 6, characterized in that:

(a) said stationary valve stem member has an axial bore extended into one end thereof, and said axial bore has a closed end and an open end that communicates with said upper interior passageway;

(b) said movable check valve element has a valve stem slidably mounted in the bore in the stationary valve stem member; and, (c) biasing means operatively mounted in the bore in the stationary valve stem member and normally biasing the movable check valve element stem away from the closed end of the axial bore in the stationary valve stem member.

8. A combination pressure regulator and exhaust air valve as defined in claim 4, characterized in that:

(a) a lock means is operatively mounted in said valve body means and it is releasably engagable with the regulator valve upper valve stem member.

* * * * *

UNITED STATES PATENT OFFICE
CERTIFICATE OF CORRECTION

Patent No. 4,271,864      Dated June 9, 1981

Inventor(s) James A. Neff

It is certified that error appears in the above-identified patent and that said Letters Patent are hereby corrected as shown below:

Column 4, line 29, "for" should be --from--.

Signed and Sealed this

Twenty-fifth Day of August 1981

[SEAL]

Attest:

Attesting Officer

GERALD J. MOSSINGHOFF

Commissioner of Patents and Trademarks